Patented Sept. 18, 1945

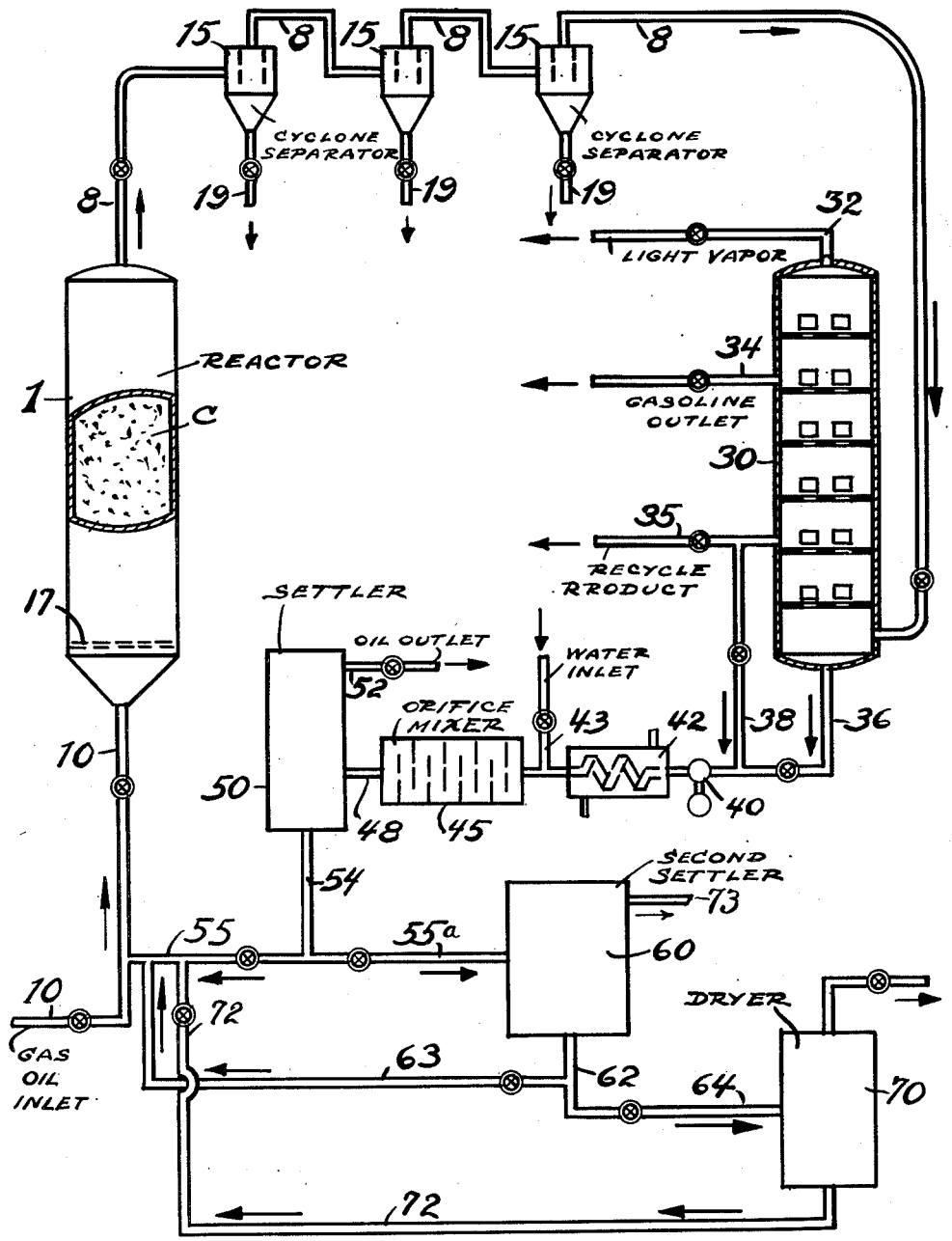

2,384,967

UNITED STATES PATENT OFFICE 2,384,967

SEPARATION OF CATALYST FROM OIL

Frederick W. Schumacher, Westfield, and Robert P. Ferguson, Cranford, N. J., assignors to Standard Oil Development Company, a corporation of Delaware Application May 29, 1943, Serial No. 489,030

9 Claims. (Cl. 196—52)

The present invention relates to improvements in the catalytic treatment of hydrocarbon oils and, more particularly, relates to the recovery of catalyst from oil with which it has become mixed during processing of said oil.

In the catalytic cracking of hydrocarbon oil, particularly in that type of operation where a powdered catalyst is present in the reaction vapors in the reaction zone, unavoidably some of the finer catalyst particles escape separation from the vapors during passage through centrifugal separators, electrical precipitators, dust collectors, etc., with the result that catalyst accumulates progressively in the condensates in the fractionation and distillation equipment. The condensates containing catalyst cannot be filtered readily because of the fineness of the catalyst. Moreover, the filter cake would require washing with naphtha to remove coke-forming constituents such as aromatics, which unless removed cause excessive coking when the catalyst is reused in cracking.

A proposed method for separating the catalyst from the condensate is that of permitting the oil containing the catalyst to remain in the quiescent zone where settling may take place. Here the difficulty is that the catalyst, when it settles, will contain entrained oil, and to remove this oil it would be necessary to wash with naphtha to dissolve out the rather heavy oil contained therein because if such oil were not removed when the catalyst was reused, this entrained oil would cause excessive coking for in the normal cracking operation the heavy bottoms in which the catalyst is contained would be highly aromatic and when recracked would produce coke amounting, in some instances, to 30% of such feed. Those aromatics would ordinarily be, in part at least, compounds containing 2 or more benzene rings in a single condensed nucleus, and it is known that this type of aromatic is a very undesirable coke former in catalytic cracking operations.

It is the main object of our present invention to separate and recover catalyst associated with petroleum oil as a result of use in cracking, finishing and other operations where the catalyst contacts the oil either in liquid or gas phase and subsequently becomes associated with the liquid oil. In particular, the object of our invention is to recover finely divided catalyst material from a body of processed liquid oil.

In carrying our present invention into effect, we subject a liquid oil containing catalyst to distillation to remove the lower boiling hydrocarbons and subject the residuum containing the catalyst to high temperature aqueous displacement of the oil.

In order, however, to facilitate understanding of our invention, we refer to the accompanying drawing in which we have shown schematically, means for accomplishing our purpose.

Referring to the drawing, I represents a reactor in which a vapor phase reaction involving the cracking of gas oil takes place. The hydrocarbon vapors in the modification shown contain suspended therein a catalyst (C) which is fed with the preheated oil vapors to the reaction zone through a feed inlet pipe 10, the suspension of catalyst in the preheated vapors passing upwardly through a foraminous distributing plate 17 into the reactor where the cracking takes place. The catalyst, for instance, may be an acid treated montmorillonite clay or a synthetic gel and the temperature (around 900° F.) within the reactor is such as to effect the cracking. Conditions are otherwise adjusted with respect to contact time, etc., (in known manner) to produce the desired conversion, and the reaction vapors are delivered to gas-solid contacting devices such as centrifugal separators or electrical precipitators adapted to cause the separation of the powdered catalyst from the vapors. These separators are indicated by the reference character 15, and as shown the vapors pass in series through the several separators which are disposed in the product line 8. The separated catalyst is withdrawn from the several separators by pipes 19. While the separators ordinarily serve to remove about 99% of the catalyst from the vapors, nevertheless 1%, more or less, of the fines remain in the line 8 after passing through the separators, and, as will subsequently appear, this material accumulates in the distillation and fractionation equipment.

This is true even when the vapors in line 8 are passed through electrical precipitators such as the so-called Cottrell precipitator, for it is extremely difficult to eliminate the last traces of the very fine catalyst material. The problem will be appreciated when it is realized that the catalyst has a size of from 200 to 400 mesh, averaging around 300 mesh for the main bulk of it, but due to the constant attrition forces to which it is subjected in passing through the system, the catalyst undergoes further subdivision, so that a portion of it is extremely fine. It is this extremely finely divided material that is virtually impossible to remove from the system by centrifugal and/or electrical separators.

Continuing, in the normal operation, the hydrocarbons are discharged into a fractionator 30 from which the light ends are taken off, say through line 32, while gasoline is taken off through line 34 and a recycle product taken off through line 35. It is unnecessary to describe further the processing of the products in lines 32, 34 and 35, respectively, since these may be treated and processed according to the known procedure to recover cracked gasoline and to recycle unconverted product (after proper reheating) to the reaction zone.

Our present invention has to do with the recovery and separation of catalyst which is contained normally in the bottom fractions withdrawn through line 36. This fraction in plant operation will contain appreciable amounts of valuable catalyst and normally will represent about 4% of the feed in line 10 to the system. The 4% heavy bottoms which are withdrawn from the fractionator 30 may first be diluted with gas oil. The material in line 36 may be extremely viscous, having a Saybolt viscosity, in some cases, of 340 seconds at 210° F., or thereabouts, and in such cases may be blended with gas oil to reduce its viscosity to about 45 seconds at 210° F., whereupon the blend has a concentration of 0.25 to 2 lbs. of catalyst per gallon.

The product in line 36 is pumped by a pump 40 into a temperature controlling means of some sort, such as a heat exchanger 42 and then withdrawn and mixed with water from line 43 and then discharged into a mixer, such as an orifice mixer 45 where the water is thoroughly mixed with the oil slurry, and then this mixture is discharged through line 48 into a settler 50. It should be pointed out that if desired, a portion of the oil in line 35 may be discharged through line 38 into line 36 for recovery of catalyst therein. The mixture is permitted to remain quiescent in 50 for a sufficient period of time to permit stratification, whereupon the upper liquid oil layer is withdrawn through 52 while the catalyst aqueous slurry is withdrawn through line 54. The aqueous slurry may be recycled via line 55 to line 10 for reuse in the cracker. However, since the oil may contain salts (including sodium salts which are highly undesirable), we prefer not to recycle the water or at least not all of the water associated with the catalyst since undesired salts will be dissolved in the water. The water is therefore separated by decantation or other means. Thus, we prefer to charge the bottoms from 50 through line 55a to a second settler 60 where the catalyst separates as a mud leaving behind in an upper aqueous layer, the undesired salts which may be withdrawn through 73. The mud may be withdrawn through line 62 and conveyed via lines 63 and 55 to line 10 entering cracker 1. Another alternative involves conducting the mud in line 62 via line 64 into a drier 70 where the water is driven off by heating or the like whereupon the dried catalyst is recycled to the cracker.

Of course it will be understood that in a complete cracking system, provision must be made for regenerating catalyst fouled during cracking. The regeneration may be accomplished, in known manner, by treatment with air or other oxygen-containing gas. We have omitted catalyst regeneration since it does not go to the heart of our invention. We may say, in passing, that the catalyst recovered from the oil slurry in our process may be delivered to cracking directly or first regenerated by burning off contaminants.

The results of a series of runs which we made in catalyst recovery from oil slurry according to the above process are set forth in the table below:

Slurry oil blend

[14.5° A. P. I. gravity, 44.8 Saybolt viscosity in seconds at 210° F., 0.5# cat./gal.]

| Settling conditions in 50 | | Water treat. | | Products | | | |
|---|---|---|---|---|---|---|---|
| Temperature °F. of mixture | Gauge pressure, lb./sq. in. | Volume per cent | Lb. H₂O/lb. catalyst | Oil, lb. catalyst/ gal. | Catalyst-water | | Emulsion, vol. per cent [2] |
| | | | | | Weight per cent cat. recovery | Weight per cent combustibles [1] | |
| 430 | 430 | 33 | 5.6 | 0.005 | 99.0 | 13 | 0 |
| 350 | 160 | 50 | 8.3 | 0.007 | 98.6 | 20 | Trace |
| 350 | 160 | 20 | 3.3 | 0.018 | 96.4 | -------- | Trace |
| 350 | 160 | 12.5 | 2.1 | 0.015 | 97.0 | 26 | 3 |
| 310 | 90 | 100 | 16.6 | 0.008 | 98.4 | 26 | 12 |
| 200 | 0 | 33 | 5.6 | 0.003 | -------- | 45 | >40 |

[1] On recovered catalyst which had been dried for eight hours at 212° F.
[2] On basis of volume of slurry oil charged to settler.

It is noted from the foregoing that we recovered a catalyst through line 55 which contained, after 8 hours drying at 212° F., amounts of combustibles varying from 0 to 45%, the maximum. It will be noted, however, that the 45% combustibles was obtained when the system was operated under 0 lbs./sq. in. gauge pressure, and it is clear from the data that high pressures should be used. For example, when the pressure was 430 lbs./sq. in., only 13% combustibles were in the catalyst. It is also obvious from the data that high temperatures, that is to say, temperatures above 200 and preferably around 350 to 400, gave improved results. Taking it all in all, it is clear from the data that to recover the maximum amount of catalyst from the oil slurry with the minimum amount of combustibles (e. g., carbonaceous material), both high temperatures and high pressures are desirable in the water treatment zone 50. Another feature of the data refers to the emulsion formation when lower pressures and temperatures were used. For example, at low pressures and relatively low temperature, the emulsion formation was greater than 40 volume per cent. However, at the higher temperatures and pressures the tendency to emulsify was eliminated substantially.

It will be understood that our invention includes many modifications. At the outset we may say that the bottoms withdrawn through line 36 from the fractionator 30 may vary as to temperature and viscosity and catalyst content. In a "once-through" operation, feeding gas oil to the cracker 1, the product in line 36 may have a specific gravity of around 13° A. P. I., a viscosity at 100° of from 175 to 200 seconds on the Saybolt viscosimeter, and may contain 1 to 2 lbs. catalyst per gallon of oil. If, as is sometimes the case, reduced crude oil is fed to the cracker 1, obviously the bottoms in line 36 would be much more viscous than in the above illustration. It is therefore desirable when the bottoms are very viscous to dilute them with a light naphtha to make them readily flowable, and it is often desirable, as a further modification of our invention, to add water at about 100° F. to the oil in such proportions as to give a final temperature within the range of the preferred conditions set forth in the foregoing table. From what has been set forth, it is believed that a skilled operator confronted with the problem of separating catalyst fines from the bottoms of a fractionator, such as 30, could, by means of a few simple experiments, readily treat any oil under the optimum conditions recommended herein where the preferred temperatures and pressure of the oil and water mixture in settler 50 are the most important considerations from every standpoint.

We consider the main advantages of our invention to be the following:

1. Complete removal of the catalyst from the hydrocarbon is accomplished upon settling.

2. The catalyst is not subjected to a high temperature steaming operation which, in certain cases, results in an undesirable increase in coke formation.

3. The separation of catalyst from heavy stocks or residue is possible and thus suspended catalyst cracking (i. e., catalyst and heavy oil mixed in slurry form) becomes feasible. Heretofore, such a process was impractical because the catalyst could not be separated by distillation without excessive coke formation.

Many modifications of our invention will suggest themselves to those who are familiar with the art. The above described process wherein we recover valuable catalyst (which may cost 50 to 60 cents per pound in the case of synthetic silica-alumina gel catalyst) from heavy bottoms in the gas oil cracking operation has been described in detail by way of illustration only, and we may recover any catalyst or non-catalytic material by a similar process from an oil slurry produced in any operation such as where, for example, an oil is treated in gas or liquid phase with a catalytic or other contact material and appears in the condensates even though the main bulk of the catalyst has been separated from the vapors but passes through a system of centrifugal and electrical separators. Nevertheless, in certain processes operating on a commercial scale and employing the aforesaid settlers, as much as a ton of catalyst or more may appear in the heavier condensates within normal on-stream periods, and in those cases it certainly is desirable to recover such catalyst in the usable form.

We claim:

1. The method of recovering catalyst from an oil slurry which comprises mixing an oil slurry containing about 0.25 to 2 lbs. of powdered catalyst per gallon of oil with water, thoroughly agitating the mixture, permitting the mixture to remain quiescent at a temperature above 300° F. and a pressure above 90 lbs./sq. in. in order to permit stratification and withdrawing a lower aqueous layer containing substantially all of the catalyst originally contained in the original oil slurry.

2. The method set forth in claim 1 in which the oil slurry is diluted with an oil of lower viscosity and then mixed with water.

3. The method set forth in claim 1 in which the water and oil are permitted to contact each other at temperatures of the order of 350–430° F. and at pressures of the order of 160–430 lbs./sq. in.

4. In the separation of catalyst material from a heavy oil which comprises thoroughly mixing the oil containing about 0.25 to 2 lbs. of powdered catalyst per gallon of oil with water, discharging the mixture into a settling zone, maintaining the oil and water mixture at a temperature above 300° F. and the pressure above 90 lbs./sq. in. whereby two liquid phases are formed consisting of an upper liquid oil phase substantially free of catalyst and a lower aqueous layer containing the catalyst formerly associated with the oil, withdrawing the lower aqueous layer and drying the latter.

5. The method of claim 4 in which the aqueous layer containing catalyst is conducted to a second settling zone, thereafter permitted to remain in said zone until the catalyst settles to form a lower mud-like layer and an upper aqueous layer containing undesired salts and separating the said lower layer from the said aqueous layer.

6. The method of cracking petroleum oil which comprises contacting the oil with a powdered catalyst under cracking conditions in a cracking zone, withdrawing catalyst and product from said zone, separating the main bulk of the catalyst from the cracking products, recovering the last traces of catalyst from the liquid condensate resulting from fractionating the cracked products and containing about 0.25 to 2 lbs. of catalyst per gallon of condensate by treating said condensate with water at a temperature above 300° F. and a pressure above 90 lbs./sq. in. in a settling zone to form an upper oil layer and a lower aqueous layer containing catalyst formerly contained in said condensate and recycling said aqueous layer to the cracking zone.

7. The method of claim 6 in which the aqueous layer is conducted to a second settling zone, permitting catalyst to separate from the water and salts dissolved therein and recycling said catalyst to said cracking zone.

8. The method of separating catalyst in finely divided condition from a relatively viscous hydrocarbon oil which comprises thoroughly mixing said oil containing about 0.25 to 2 lbs of catalyst per gallon of oil with water, passing the mixture into a settling zone, maintaining the said zone under a temperature above 300° F. at a pressure above 90 lbs./sq. in. whereby two liquid phases are formed, the upper phase being an oil phase substantially free of catalyst and the lower phase being an aqueous phase containing substantially all of the catalyst originally associated with the oil, withdrawing the lower layer containing the catalyst and drying the last-named layer to recover a catalyst substantially free of the original oil.

9. In the separation of catalyst in finely divided condition from a relatively heavy hydrocarbon oil, the improvement which comprises thoroughly mixing water with said oil containing about 0.25 to 2 lbs of catalyst per gallon of oil and maintaining the mixture under a temperature above 300° F. and a pressure above 90 lbs./sq. in. thereby causing the formation of two liquid layers substantially free of emulsion, the upper layer being an oil layer and the lower layer being an aqueous layer and containing substantially all of the catalyst originally associated with the oil.

FREDERICK W. SCHUMACHER.
ROBERT P. FERGUSON.